US008868314B2

(12) United States Patent
Morita et al.

(10) Patent No.: US 8,868,314 B2
(45) Date of Patent: Oct. 21, 2014

(54) CONTROL DEVICE FOR VEHICLE

(75) Inventors: Masaki Morita, Toyota (JP); Tadashi Nakagawa, Miyoshi (JP); Hiroshi Kishita, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 478 days.

(21) Appl. No.: 13/144,951

(22) PCT Filed: Jun. 18, 2009

(86) PCT No.: PCT/JP2009/061109
§ 371 (c)(1),
(2), (4) Date: Jul. 18, 2011

(87) PCT Pub. No.: WO2010/146691
PCT Pub. Date: Dec. 23, 2010

(65) Prior Publication Data
US 2012/0074238 A1 Mar. 29, 2012

(51) Int. Cl.
F02D 13/02 (2006.01)
B60H 1/02 (2006.01)
F02P 5/15 (2006.01)
F02D 41/02 (2006.01)
G06F 19/00 (2011.01)
F02D 43/00 (2006.01)
F02D 29/04 (2006.01)
F02D 41/00 (2006.01)
F01P 3/02 (2006.01)

(52) U.S. Cl.
CPC ............ *F02D 29/04* (2013.01); *Y02T 10/46* (2013.01); *F02P 5/1502* (2013.01); *Y02T 10/18* (2013.01); *F02D 2041/001* (2013.01); *F02D 2200/022* (2013.01); *F02D 41/021* (2013.01); *F01P 2060/04* (2013.01); *F01P 2003/028* (2013.01); *F02D 13/0249* (2013.01); *F01P 2060/08* (2013.01)
USPC ........................................ 701/101

(58) Field of Classification Search
USPC ................ 701/101, 102, 115, 36; 123/41.01, 123/41.05, 41.12, 41.44, 41.52, 543, 549; 165/201, 202; 237/12.3 R, 5
See application file for complete search history.

(56) References Cited

U.S. PATENT DOCUMENTS 6,257,198 B1 7/2001 Harada
6,591,174 B2 * 7/2003 Chung et al. .................... 701/36

(Continued)

FOREIGN PATENT DOCUMENTS

DE 10306457 A1 8/2004
EP 0775818 A2 5/1997

(Continued)

OTHER PUBLICATIONS

Aug. 7, 2012 Office Action issued in Japanese Patent Application No. 2011-519369 (with translation).

(Continued)

*Primary Examiner* — Hieu T Vo
(74) *Attorney, Agent, or Firm* — Oliff PLC

(57) ABSTRACT

By employing a heat source control section that controls the operating state of an internal combustion engine mounted in a vehicle, a necessary heat calculating section that calculates the engine coolant temperature needed by a heater core, which consumes the heat supplied from the engine through engine coolant water, and the time at which this engine coolant temperature becomes necessary, a heat supply estimating section that estimates engine coolant temperature at the aforementioned time in a case in which the engine is operated continuously in the current operating state, and a heat generation increase requesting section that requests the heat source control section to increase heat generation quantity of the engine when the engine coolant temperature estimated by the heat supply estimating section is less than the engine coolant temperature calculated by the necessary heat calculating section, the heat necessary for the heater core is supplied more efficiently and adequately.

27 Claims, 4 Drawing Sheets

(56) References Cited

U.S. PATENT DOCUMENTS

| | | | |
|---|---|---|---|
| 8,612,092 B2 * | 12/2013 | Okamoto et al. | ............... 701/36 |
| 2006/0117737 A1 | 6/2006 | Ohsaki | |
| 2006/0213185 A1 | 9/2006 | Bevan et al. | |

FOREIGN PATENT DOCUMENTS

| | | |
|---|---|---|
| EP | 1048835 A2 | 11/2000 |
| JP | A-61-155637 | 7/1986 |
| JP | A-03-160136 | 7/1991 |
| JP | A-2005-016465 | 1/2005 |
| JP | A-2005-207321 | 8/2005 |
| JP | A-2006-161625 | 6/2006 |
| JP | A-2006-170060 | 6/2006 |
| JP | A-2009-121404 | 6/2009 |

OTHER PUBLICATIONS

International Search Report issued in International Application No. PCT/JP2009/061109 dated Aug. 11, 2009.

* cited by examiner

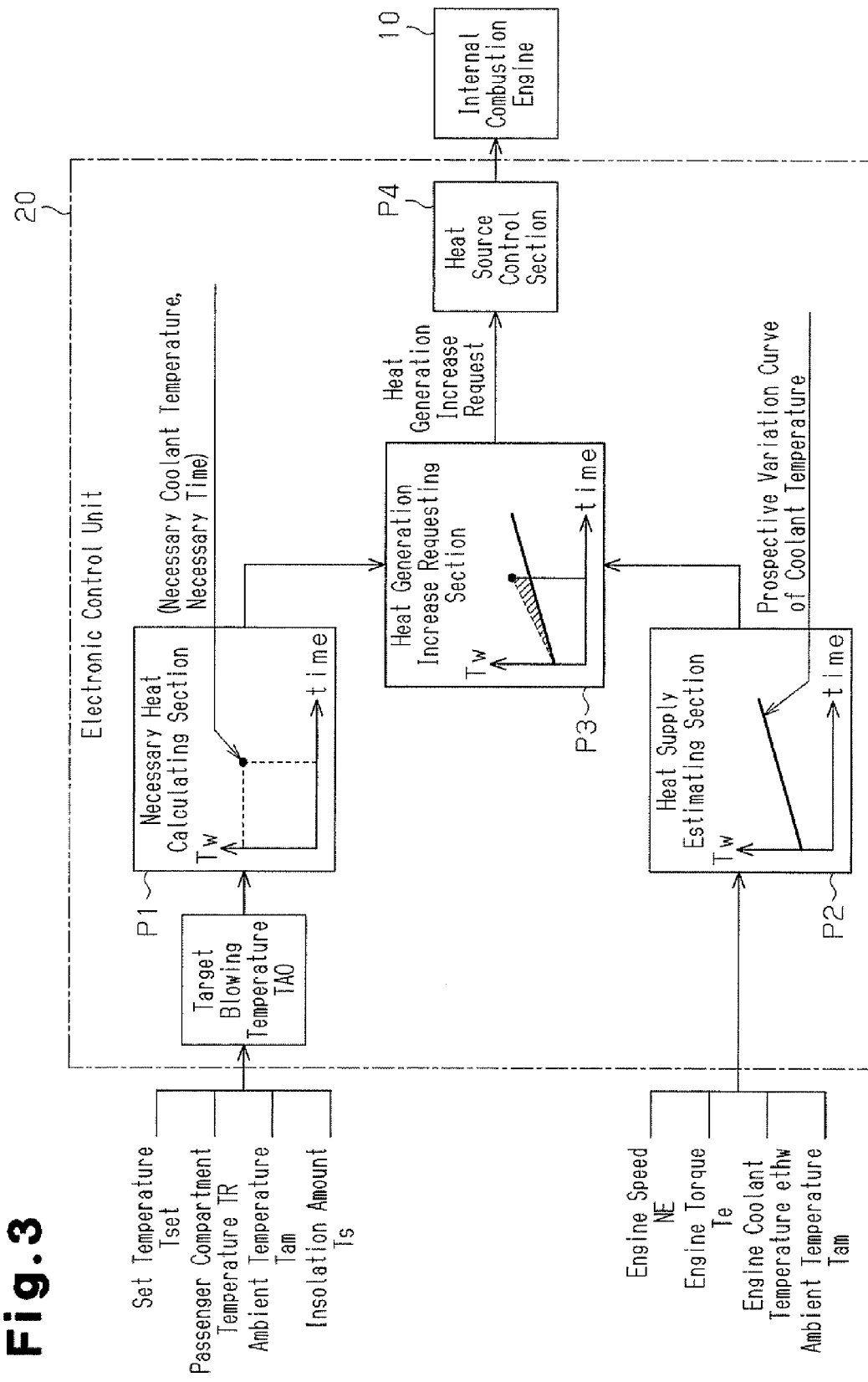

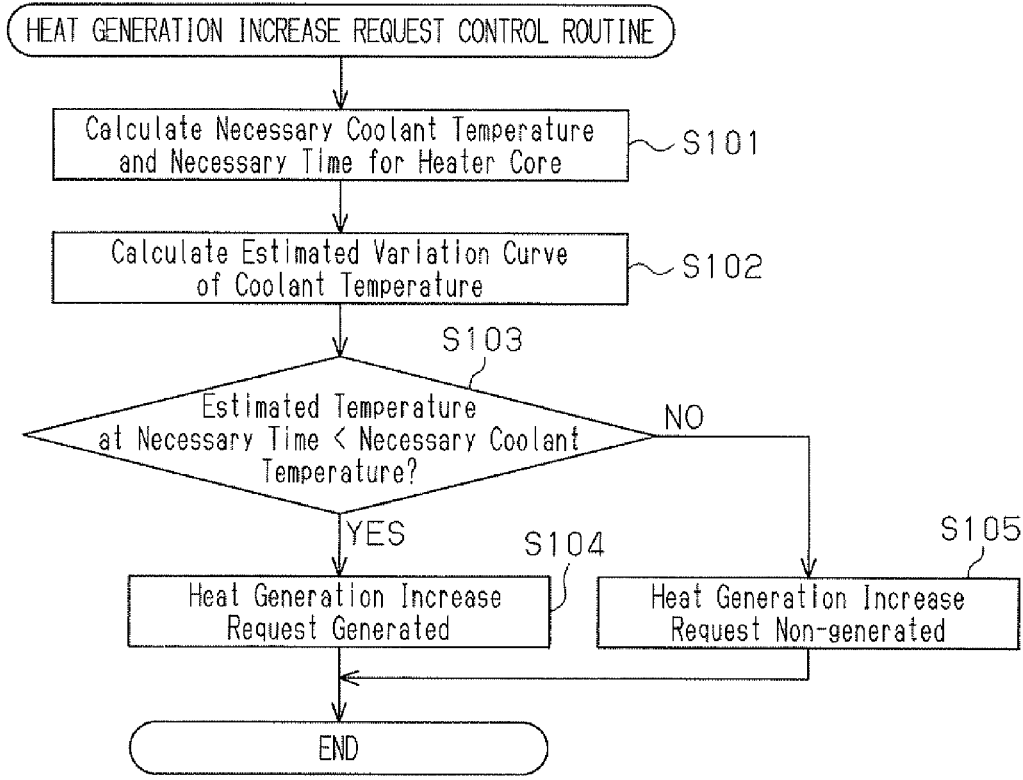
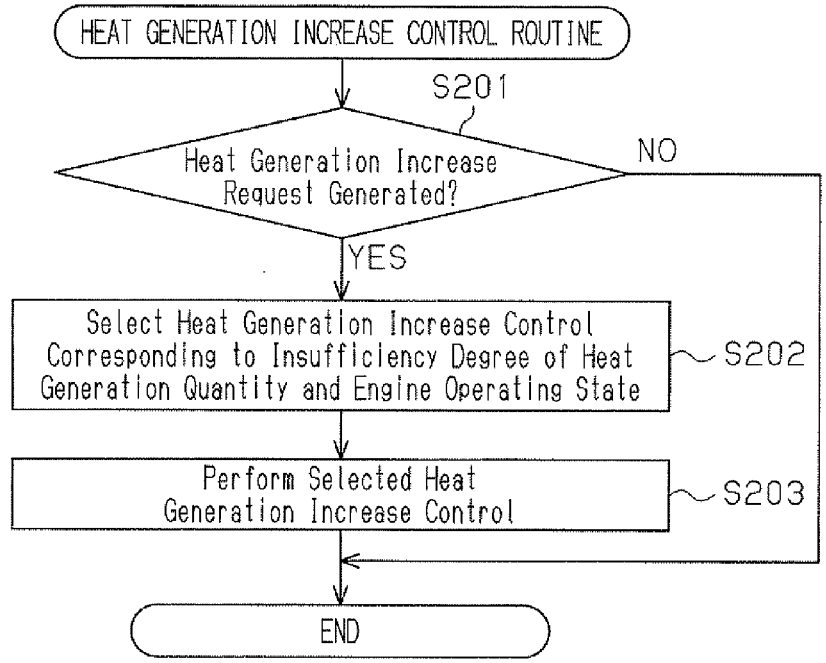

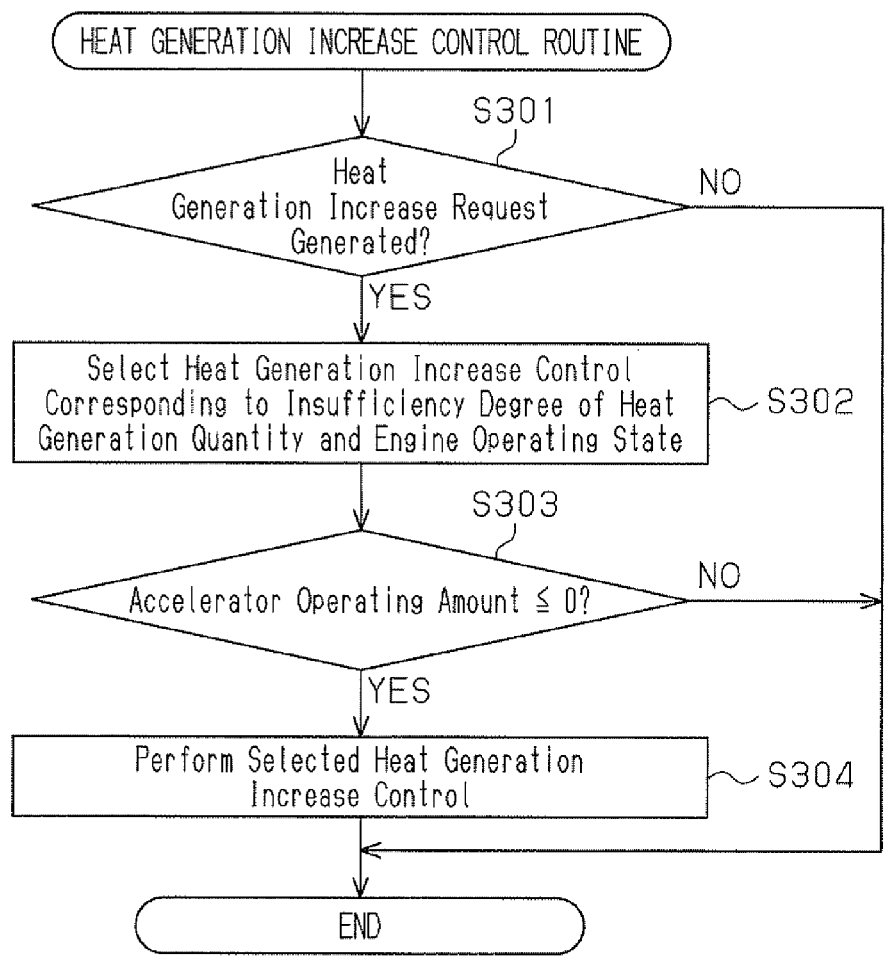

CONTROL DEVICE FOR VEHICLE

TECHNICAL FIELD

The present invention relates to a control device for a vehicle for allowing the vehicle to use heat efficiently.

BACKGROUND ART

A vehicle includes a number of devices that use heat produced by an internal combustion engine, such as a heater device or an oil warmer. However, as engines have become more efficient and more compact to improve combustion performance, engine heat has decreased, thus making it difficult to ensure production of a sufficient quantity of heat. To solve the problem, there is a demand for heat use efficiency to be improved.

Conventionally, a control device described in Patent Document 1 has been proposed as a control device intended to ensure production of a necessary quantity of heat for a heater device for a vehicle having a low-displacement and low-heat-generation internal combustion engine. The control device described in Patent Document 1 carries out heat generation increase control by raising the engine idle speed and retarding the ignition timing when various conditions are met, or, specifically, on condition that the engine is in idle operation, that the heater device is in operation, that the engine coolant temperature is less than a set value, and that the increase rate of the engine coolant temperature is less than a set value.

The conventional control device for a vehicle increases the quantity of heat produced by the engine by raising the engine idle speed and retarding the ignition timing when it is determined that the engine coolant temperature is low and increases only with a small increase rate and thus the quantity of heat supplied to the heater device will likely fall short. As a result, in using the control device, heating performance of the heater device is prevented from being lowered to a certain extent.

PRIOR ART REFERENCE

Patent Document

Patent Document 1: Japanese Laid-Open Patent Publication No. 2005-16465

SUMMARY OF THE INVENTION

Problems that the Invention is to Solve

However, the conventional control device for a vehicle performs the heat generation increase control on the engine each time the current engine coolant temperature and the increase rate of the engine coolant temperature are low, regardless of the quantity of heat required by the heater device. Also, the heat generation increase control is carried out uniformly regardless of the quantity of heat required by the heater device. As a result, the quantity of heat supplied from the engine to the heater device may become excessively great or fall short. That is, use of the heat is not necessarily efficient.

The above-described problem of inefficient heat use is not restricted to the heater device but is a common problem for general devices that use heat produced by heat sources mounted in vehicles.

Accordingly, it is an objective of the present invention to provide a control device for a vehicle that ensures a more efficient and adequate supply of heat as required by a heat consuming device mounted in the vehicle.

To achieve the foregoing objective and in accordance with the present invention, a control device for a vehicle is provided that includes a heat source section, a necessary heat calculating section, a heat supply estimating section, and a heat generation increase requesting section. The heat source control section controls the operating state of a heat source mounted in the vehicle. The necessary heat calculating section calculates an indication value of a prospective quantity of heat that will be needed by a heat consuming device that uses heat produced by the heat source. The heat supply estimating section estimates an indication value of a prospective quantity of heat that will be suppliable by the heat source to the heat consuming device. The heat generation increase requesting section requests the heat source control section to increase a heat generation quantity of the heat source when the quantity of heat indicated by the indication value estimated by the heat supply estimating section is less than the quantity of heat indicated by the indication value calculated by the necessary heat calculating section.

In the present invention, the calculation result of the indication value of the prospective quantity of heat that will be needed by the heat consuming device, which uses the heat generated by the heat source mounted in the vehicle, is compared with the estimation result of the indication value of the prospective quantity of heat that will be suppliable by the heat source to the heat consuming device. If the prospective quantity of heat needed by the heat consuming device is less than the prospective quantity of heat that will be suppliable by the heat source to the heat consuming device, the increase request for the heat generation quantity is provided to the heat source control section, which controls the operating state of the heat source. In this manner, in the invention, it is determined whether the increase request for the heat generation quantity of the heat source should be generated based on comparison between the indication value of the prospective quantity of heat that will be needed by the heat consuming device and the indication value of the prospective quantity of heat that will be suppliable by the heat source to the heat consuming device. In response to the request for increasing the heat generation quantity, control is performed to increase the heat generation quantity of heat source. Accordingly, in the invention, heat generation increase control for the heat source is carried out only when the prospective quantity of heat that will be suppliable by the heat source to the heat consuming device is insufficient for the prospective quantity of heat that will be needed by the heat consuming device. As a result, the invention ensures a more efficient and adequate supply of the heat as required by the heat consuming device mounted in the vehicle.

As the indication value of the heat quantity, any parameter in correlation with the quantity of heat supplied from the heat source to the heat consuming device may be employed. For example, the temperature of heat transmission medium for heat transmission from a heat source to a heat consuming device or the time of heat generation by a heat source that intermittently produces heat may be used as the indication value of the heat quantity. Alternatively, the value of the heat quantity may be used directly as the indication value.

To determine more accurately whether the quantity of heat transmitted from the heat source to the heat consuming device is sufficient, the necessary heat calculating section may be configured to calculate the indication value of the quantity of heat needed by the heat consuming device and the time at which this quantity of heat becomes necessary. Also, the heat supply estimating section may be configured to estimate the indication value of the quantity of heat that will be suppliable by the heat source to the heat consuming device at the calculated time. Alternatively, by configuring the heat supply estimating section to determine a prospective variation curve of the indication value of the quantity of heat that will be suppliable by the heat source to the heat consuming device, and estimate the indication value of the quantity of heat that can be supplied at the time with reference to the determined variation curve, it is determined more accurately whether the heat supply quantity is sufficient.

When the heat consuming device is a heater core of a heater device that heats a passenger compartment, the necessary fuel calculating section may be configured to calculate a heated air blowing temperature for the heater device based on the environmental condition inside and outside the passenger compartment and determine the indication value of the above-described heat quantity and the above-described time in accordance with the obtained blowing temperature.

The quantity of heat generated by the heat source varies depending on the operating state of the heat source. Accordingly, if the heat source is operated continuously under a condition with a small heat generation quantity, the prospective quantity of heat that will be suppliable by the heat source to the heat consuming device may be overestimated, thus causing insufficiency in heat supply to the heat consuming device. In this case, such insufficiency in the heat supply to the heat consuming device can be avoided by configuring the heat supply estimating section to estimate the indication value of the heat quantity on the assumption that the heat source will be operated under an operating condition with a small heat generation quantity.

When heat is transmitted from the heat source to the heat consuming device through heat transmission medium, the necessary heat calculating section and the heat supply estimating section may be configured to calculate and estimate, respectively, the indication value of the heat quantity as the temperature of the heat transmission medium. Specifically, this may be the case when the heat source is an internal combustion engine and the heat transmission medium is coolant water in the engine.

To ensure more efficient heat supply, a plurality of controls may be used as heat generation increase control of the heat source in response to the increase request for the heat generation quantity from the heat generation increase requesting section. The heat source control section is configured to select a heat generation increase control to be performed from the multiple controls in accordance with the degree of insufficiency of the heat quantity indicated by the indication value estimated by the heat supply estimating section with respect to the heat quantity indicated by the indication value calculated by the necessary heat calculating section. In this case, the heat generation increase controls may include a first control with high heat generation efficiency and a small increase in the heat generation quantity of the heat source and a second control with a great increase in the heat generation quantity of the heat source and a low heat generation efficiency. The heat source control section is configured to select the first control when the degree of insufficiency of the heat quantity is small and the second control when the degree of insufficiency of the heat quantity is great. In this manner, the increase request for the heat generation quantity is responded efficiently. If the heat source is an internal combustion engine, the heat generation increase controls may include exhaust valve opening retardation control and ignition timing retardation control. The heat source control section is configured to select the exhaust valve opening retardation control when the degree of insufficiency of the heat quantity is small and the ignition timing retardation control when the degree of insufficiency of the heat quantity is great. This ensures more efficient heat supply.

To achieve the foregoing objective, another control device for a vehicle in accordance with the present invention includes a heat source control section, a necessary heat calculating section, a heat supply estimating section, and a heat generation increase requesting section. The heat source control section controls the operating state of a heat source mounted in a vehicle. The necessary heat calculating section calculates the temperature of a heat transmission medium needed for ensuring a heat quantity required by a heat consuming device that uses heat supplied from the heat source through the heat transmission medium, and a time at which the temperature will be necessary. The heat supply estimating section estimates the temperature of the heat transmission medium at said time in a case in which the heat source is operated continuously in the current operating state. The heat generation increase requesting section requests the heat source control section to increase a heat generation quantity of the heat source when the temperature of the heat transmission medium estimated by the heat supply estimating section is lower than the temperature of the heat transmission medium calculated by the necessary heat calculating section.

In the above-described invention, the temperature of the heat transmission medium necessary for ensuring the heat quantity required by the heat consuming device and the time at which this temperature becomes necessary are calculated by the necessary heat calculating section. Also, the temperature of the heat transmission medium at the aforementioned time in a case in which the heat source is operated continuously in the current operating state is estimated by the heat supply estimating section. If the temperature of the heat transmission medium estimated by the heat supply estimating section is lower than the temperature of the heat transmission medium calculated by the necessary heat calculating section, an increase request for the heat generation quantity of the heat source is provided to the heat source control section, which controls the operating state of the heat source. In other words, in the invention, determination of whether the quantity of heat generated by the engine is sufficient occurs after determination of a necessary temperature of the heat transmission medium and the time at which this temperature becomes necessary. As a result, the invention ensures more efficient and adequate supply of the heat needed by the heat consuming device mounted in the vehicle.

The invention is usable in a vehicle in which the heat source is an internal combustion engine and the heat transmission medium is coolant water in the engine. If the heat consuming device is a heater core of a heater device, the necessary fuel calculating section may be configured to calculate a heated air blowing temperature of the heater device based on the set temperature of the heater device and the environmental condition inside and outside the passenger compartment and determine the temperature of the heat transmission medium and the time at which this temperature becomes necessary in accordance with the calculated blowing temperature.

In this configuration, insufficiency in heat supply for the heat consuming device may be avoided by configuring the heat supply estimating section to estimate the temperature of the heat transmission medium on the assumption that the heat source will be operated under an operating condition with a small heat generation quantity.

To ensure more efficient heat supply by the controller for a vehicle according to the present invention, which is configured as has been described, the heat source control section may be configured to variably set the content of the heat generation increase control of the heat source in response to the increase request for the heat generation quantity from the heat generation increase requesting section in accordance with the degree of insufficiency of the temperature of the heat transmission medium estimated by the heat supply estimating section with respect to the temperature of the heat transmission medium calculated by the necessary heat calculating section.

To perform more efficient heat supply, a plurality of controls may be used as the heat generation increase control of the heat source in response to the increase request for the heat generation quantity from the heat generation increase requesting section. The heat source control section is configured to select a heat generation increase control to be performed from the multiple controls in accordance with the degree of insufficiency of the temperature of the heat transmission medium estimated by the heat supply estimating section with respect to the temperature of the heat transmission medium calculated by the necessary heat calculating section. In this case, the heat generation increase controls may include a first control with high heat generation efficiency and a small increase in the heat generation quantity of the heat source and a second control with a great increase in the heat generation quantity of the heat source and a low heat generation efficiency. The heat source control section is configured to select the first control when the degree of insufficiency of the temperature of the heat transmission medium is small and the second control when the degree of insufficiency of the aforementioned temperature is great. In this manner, the increase request for the heat generation quantity is responded efficiently. If the heat source is an internal combustion engine, the heat generation increase controls may include exhaust valve opening retardation control and ignition timing retardation control. The heat source control section is configured to select the exhaust valve opening retardation control when the degree of insufficiency of the temperature of the heat transmission medium is small and the ignition timing retardation control when the degree of insufficiency of the aforementioned temperature is great. This ensures more efficient heat supply.

The content of the optimal heat generation increase control may change depending on the operating state in which the heat source is operated. Accordingly, a plurality of controls may be used as the heat generation increase control for the heat source in response to the increase request for the heat generation quantity from the heat generation increase requesting section. The heat source control section is configured to select a heat generation increase control to be performed from the controls in accordance with the operating state of the heat source. In this manner, the heat generation increase control suitable for the current operating state of the heat source is carried out. Selection of an optimal heat generation increase control is ensured by configuring the heat source control section to select, for example, the control with the highest heat generation efficiency in the current operating state of the heat source as the heat generation increase control to be performed. If the heat source is, for example, an internal combustion engine, the heat generation increase controls may include exhaust valve opening retardation control and ignition timing retardation control. The heat source control section is configured to select the exhaust valve opening retardation control when the speed of the engine is low and the ignition timing retardation control when the speed of the engine is high. In this manner, an optimal heat generation increase control is selected.

When the heat generation increase control is executed in response to the increase request for the heat generation quantity from the heat generation increase requesting section, the operating state of the heat source may change and thus influence traveling of the vehicle. Also, operation of the heat source is controlled in response to other requests than the increase request for the heat generation quantity when the vehicle travels. Accordingly, if the heat generation increase control is carried out when the vehicle runs, adjustment must be performed between operating control on the heat source, which responds to the other requests, and the heat generation increase control, which complicates controlling. To solve this problem, the heat source control section may be configured to execute the heat generation increase control in response to the increase request for the heat generation quantity from the heat generation increase requesting section when the load required is zero. In this manner, the heat generation increase control is carried out comparatively easily without being limited by adjustment with respect to traveling of the vehicle or other operating controls.

BRIEF DESCRIPTION OF THE DRAWINGS

FIG. 3 is a block diagram schematically representing the configuration of a control system related to execution of heat generation increase control for the first embodiment;

FIG. 4 is a flowchart representing a procedure for a heat generation increase request control routine used in the first embodiment;

FIG. 5 is a flowchart representing a procedure for a heat generation increase control routine used in the first embodiment; and FIG. 6 is a flowchart representing a procedure for a heat generation increase control routine used in a second embodiment of the control device for a vehicle according to the present invention.

DETAILED DESCRIPTION OF THE PREFERRED EMBODIMENTS

The principle configuration of a control device for a vehicle according to the present invention will now be described.

Figure 1:
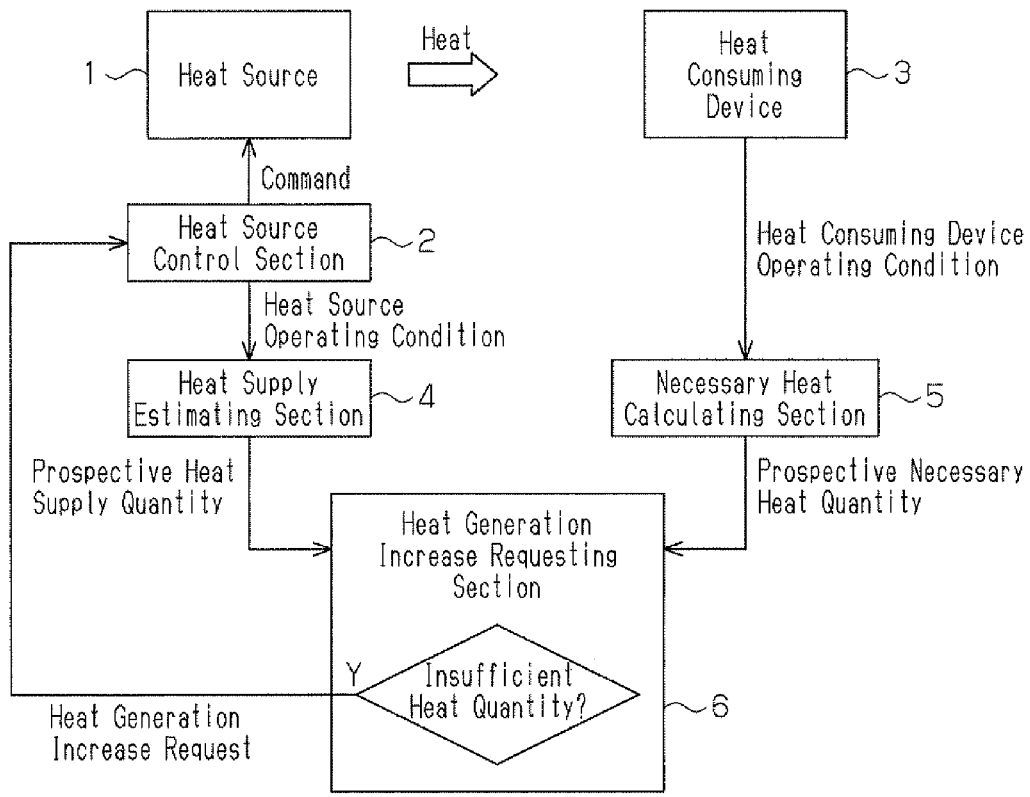
FIG. 1 is a block diagram representing the basic configuration of a control device for a vehicle according to the present invention.

As illustrated in FIG. 1, the vehicle includes a heat source 1, which generates heat, and a heat source control section 2 for controlling the heat source 1. The heat source 1 is, for example, an internal combustion engine, a motor, an inverter, or a fuel cell.

The vehicle also includes a heat consuming device 3, which uses the heat generated by the heat source 1. The heat consuming device 3 is, for example, a heater core in a heater device, an oil warmer in a transmission, a battery, a motor, a differential, a fuel cell stack, or a heat storage device. Normally, the heat is supplied from the heat source 1 to the heat consuming device 3 through a heat transmission medium such as coolant water.

The control device for a vehicle according to the invention includes a heat supply estimating section 4, which estimates the prospective quantity of heat that will be suppliable by the heat source 1 to the heat consuming device 3. Specifically, the heat supply estimating section 4 estimates the prospective quantity of heat that will be suppliable by the heat source 1 to the heat consuming device 3 based on the current operating state of the heat source 1. If the heat is supplied from the heat source 1 to the heat consuming device 3 through the heat transmission medium, the temperature of the heat transmission medium may be used as an indication value of the quantity of heat supplied to the heat consuming device 3. In this case, the heat supply estimating section 4 may be configured to estimate prospective variation of the temperature of the heat transmission medium that is expected to occur when the heat source 1 is operated in the current operating state.

The control device for a vehicle according to the invention also includes a necessary heat calculating section 5, which calculates the prospective quantity of heat that will be needed by the heat consuming device 3. Specifically, the necessary heat calculating section 5 calculates the prospective quantity of heat that will be needed by the heat consuming device 3 based on the current operating state of the heat consuming device 3. If the heat is supplied from the heat source 1 to the heat consuming device 3 through heat transmission medium such as coolant water, the temperature of the heat transmission medium may be used as an indication value for the quantity of heat needed by the heat consuming device 3. In this case, the necessary heat calculating section 5 may be configured to calculate the temperature of the heat transmission medium needed by the heat consuming device 3 and the time at which this temperature becomes necessary.

The control device for the vehicle according to the invention also includes a heat generation increase requesting section 6. The heat generation increase requesting section 6 compares the heat quantity (the prospective heat supply quantity) estimated by the heat supply estimating section 4 with the heat quantity (the prospective necessary heat quantity) estimated by the necessary heat calculating section 5. When it is determined that the prospective heat supply quantity of the heat source 1 cannot reach the prospective necessary heat quantity for the heat consuming device 3, the heat generation increase requesting section 6 outputs a heat generation increase request to the heat source control section 2. In response to the heat generation increase request, the heat source control section 2 controls the heat source 1 to increase the quantity of heat generated by the heat source 1.

As has been described, in the present invention, it is determined whether the heat generation increase request should be output for the heat source 1 through comparison between the prospective necessary heat quantity for the heat consuming device 3 and the prospective quantity of heat that will be suppliable by the heat source 1 to the heat consuming device 3. In response to the heat generation increase request, control for increasing the quantity of heat generated by the heat source 1 is carried out. Accordingly, when the prospective quantity of heat supplied from the heat source 1 to the heat consuming device 3 falls short of the prospective necessary heat quantity for the heat consuming device 3, the heat generation increase control is carried out on the heat source 1. This ensures more efficient and adequate supply of the heat required by the heat consuming device 3.

First Embodiment

A first embodiment of the control device for a vehicle according to the present invention will hereafter be described with reference to FIGS. 2 to 5. Specifically, the present embodiment will be described as to, by way of example, a case in which the internal combustion engine mounted in the vehicle is the heat source and the heater core in the heater device for heating the passenger compartment is the heat consuming device.

Figure 2:
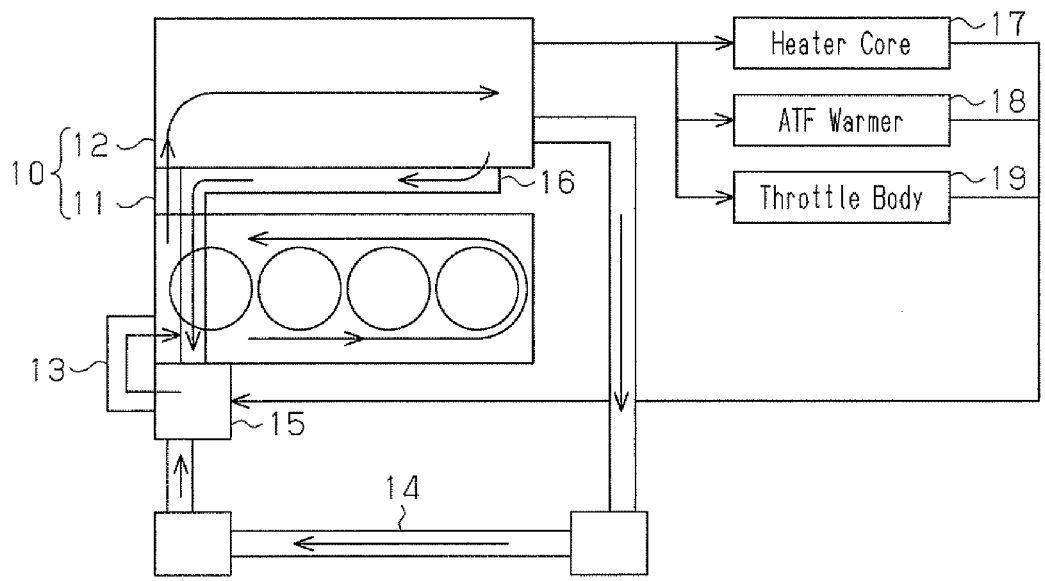
FIG. 2 is a block diagram schematically representing the configuration of a cooling system in a vehicle employing a first embodiment of the control device for a vehicle according to the present invention.

FIG. 2 represents the configuration of a cooling system in a vehicle employing the present embodiment. A water jacket is formed in a cylinder head 11 and a cylinder block 12 of an internal combustion engine 10 serving as a heat source. Coolant water circulates in the water jacket by means of a water pump 13.

After having passed through the cylinder head 11 and the cylinder block 12, the coolant water is cooled by a radiator 14 and returned to the engine 10 when the engine coolant temperature is sufficiently high. In contrast, if the engine coolant temperature is low, a thermostat 15 closes a circulation path of the coolant water including the radiator 14. The coolant water thus bypasses the radiator 14 and circulates through a bypass passage 16.

Some of the coolant water that has passed through the cylinder head 11 and the cylinder block 12 is sent also to a heater core 17 in a heater device, an ATF warmer 18 for warming ATF, and a throttle body 19. The heater core 17 heats the air for the passenger compartment using the heat of the coolant water. The ATF warmer 18 warms automatic transmission fluid (ATF) using the heat of the coolant water. The coolant water supplied to the throttle body 19 heats a throttle valve with the heat from the coolant water, thus preventing malfunctioning of the throttle valve caused by icing.

In this vehicle, the heater core 17 of the heater device serving as a heat consuming device receives heat from the engine 10 by means of the coolant water, which is heat transmission medium, and heats the air through the heat. Accordingly, when the engine 10 is cold-started with a low engine coolant temperature, the heater core 17 receives an insufficient quantity of heat and cannot ensure sufficient heating performance. To solve the problem, the control device for a vehicle of the present embodiment performs the heat generation increase control for increasing the quantity of heat generated by the engine 10 when the quantity of heat supplied from the engine 10 to the heater core 17 is insufficient.

FIG. 3 represents the configuration of a control system for a vehicle related to execution of the heat generation increase control. The center of the control system for a vehicle is an electronic control unit 20. The electronic control unit 20 receives signals from various sensors that detect the traveling state of the vehicle. The electronic control unit 20 controls the vehicle by actuating various actuators mounted in the vehicle based on detection results from the sensors. As illustrated in the diagram, the electronic control unit 20 includes a necessary heat calculating section P1, a heat supply estimating section P2, a heat generation increase requesting section P3, and a heat source control section P4.

The necessary heat calculating section P1 calculates the engine coolant temperature (the necessary coolant temperature) needed by the heater core 17 to ensure sufficient heating performance and the time at which the engine coolant temperature is needed, based on the set temperature of the heater device and the environmental condition inside and outside the passenger compartment. More specifically, the necessary heat calculating section P1 calculates the engine coolant temperature needed by the heater core 17 and the time at which this engine coolant temperature becomes necessary in accordance with the heated air blowing temperature of the heater device, which is determined based on the set temperature Tset of the heater device, the passenger compartment temperature TR, the ambient temperature Tam, and the insolation quantity Ts. The necessary heat calculating section P1 then provides the calculated engine coolant temperature and the obtained time to the heat generation increase requesting section P3.

The heat supply estimating section P2 determines a prospective variation curve for the engine coolant temperature based on the operating state of the engine 10. More specifically, the heat supply estimating section P2 calculates the variation curve of the engine coolant temperature based on the current engine speed NE, the engine torque Te, the engine coolant temperature ethw, and the ambient temperature Tam. In FIG. 3, the variation curve of the engine coolant temperature is represented as a primary curve, which is a straight line. Using the thus obtained variation curve, the estimated engine coolant temperature at the time calculated by the necessary heat calculating section P1 may be determined. The heat supply estimating section P2 provides the obtained variation curve to the heat generation increase requesting section P3.

Specifically, the heat supply estimating section P2 calculates the variation curve of the engine coolant temperature on the assumption that the vehicle travels with a low heat generation of the engine 10, or, in other words, the vehicle travels on a flat surface at a constant speed of approximately 40 km/h. That is, by estimating the increase of the engine coolant temperature to be relatively small, the necessary quantity of heat is reliably supplied to the heater core 17 at the necessary time.

The heat generation increase requesting section P3 compares the calculation result of the necessary heat calculating section P1 with the estimation result of the heat supply estimating section P2. Through such comparison, the heat generation increase requesting section P3 determines whether the quantity of heat supplied from the engine 10 to the heater core 17 is insufficient. If the heat supply is insufficient, the heat generation increase requesting section P3 outputs a heat generation increase request to the heat source control section P4. Specifically, the heat generation increase requesting section P3 determines the estimate for the engine coolant temperature (the estimated coolant temperature) at the aforementioned time calculated by the necessary heat calculating section P1 using the variation curve of the engine coolant temperature obtained by the heat supply estimating section P2. The heat generation increase requesting section P3 then compares the obtained estimate with the engine coolant temperature (the necessary coolant temperature) calculated by the necessary heat calculating section P1. If the estimated coolant temperature is less than the necessary coolant temperature, the heat generation increase requesting section P3 determines that the heat supply quantity is insufficient.

In response to the heat generation increase request, the heat source control section P4, which controls the engine 10 serving as the heat source, carries out the heat generation increase control to increase the heat generation quantity of the engine 10. Specifically, the heat source control section P4 selects and performs the most efficient type from a plurality of types of the heat generation increase control, which are prepared in advance, in accordance with the degree of insufficiency of the quantity of heat generated by the engine 10 (the difference between the necessary coolant temperature and the estimated coolant temperature) and the operating state of the engine 10.

In the present embodiment, the heat source control section P4 includes the three types of control, which are exhaust valve opening retardation control, ignition timing retardation control, and idle-up control.

In the exhaust valve opening retardation control, the heat source control section P4 operates a variable valve timing mechanism mounted in the engine 10 to retard the timing for opening exhaust valves and ignition timing, thus promoting rise of the engine coolant temperature. Specifically, by retarding the timing for opening the exhaust valves, the internal EGR is raised and combustion slows down. Also, heated burned gas remains in combustion chambers for a prolonged period. As a result, through such retarded opening of the exhaust valves, heat loss in the engine 10 is increased and the quantity of the heat transmitted from the burned gas to the coolant water is increased. This promotes the rise of the engine coolant temperature.

In the ignition timing retardation control, the heat source control section P4 promotes the rise of the engine coolant temperature by retarding the ignition timing of the engine 10. By retarding the ignition timing, output torque of the engine 10 is decreased and the heat loss is increased correspondingly. As a result, the rise of the engine coolant temperature is promoted also through the retarded ignition timing.

In the idle-up control, the heat source control section P4 promotes the rise of the engine coolant temperature by raising the idle speed of the engine 10 compared to a normal value.

In the present embodiment, the heat source control section P4 variably sets the content of the heat generation increase control for the engine 10 in response to the heat generation increase request from the heat generation increase requesting section P3, in accordance with the degree of insufficiency of the estimated coolant temperature obtained by the heat supply estimating section P2 with respect to the necessary coolant temperature calculated by the necessary heat calculating section P1. More specifically, the heat source control section P4 selects which of the aforementioned three types of the heat generation increase control should be carried out depending on the degree of insufficiency of the estimated coolant temperature with respect to the necessary coolant temperature. In other words, when the degree of insufficiency of the estimated coolant temperature with respect to the necessary coolant temperature is low, the heat source control section P4 selects the type of the control with a high heat generation efficiency and small increase in heat generation of the engine 10. When the degree of insufficiency of the estimated coolant temperature with respect to the necessary coolant temperature is high, the heat source control section P4 selects the type of the control with great increase in the heat generation of the engine 10 and a low heat generation efficiency.

When the engine 10 is in idle operation, the heat generation quantity becomes greater and the heat generation efficiency becomes smaller sequentially in the order of the exhaust valve opening retardation control, the ignition timing retardation control, and the idle-up control. Accordingly, for the idle operation, the heat source control section P4 basically carries out the exhaust valve opening retardation control with the maximum heat generation efficiency as the heat generation increase control. When the degree of insufficiency of the estimated coolant temperature with respect to the necessary coolant temperature is too great to compensate simply through the exhaust valve opening retardation control, the heat source control section P4 selectively performs the ignition timing retardation control. If the degree of insufficiency is even greater, the heat source control section P4 selectively carries out the idle-up control.

The optimal heat generation increase control changes depending on the operating state of the engine 10. For example, when the engine 10 is in the idle operation with a low engine speed, the exhaust valve opening retardation control is the heat generation increase control of the maximum heat generation efficiency, as has been described. However, when the engine 10 is in a vehicle traveling state with a high engine speed, the heat generation efficiency in the exhaust valve opening retardation control is lower than the heat generation efficiency in the ignition timing retardation control for the reason described below. Specifically, when the engine 10 is in the vehicle traveling state, the absolute intake air amount is great and thus the proportion of the internal EGR in the total gas amount in a combustion chamber remains small, despite the fact that internal EGR is increased through the exhaust valve opening retardation control. Also, when the engine 10 is in the vehicle traveling state, the flow speed of the intake air flowing into a combustion chamber is high, thus blowing the burned gas out of the combustion chamber. The amount of the burned gas remaining in the combustion chamber is thus decreased. Accordingly, when the engine 10 is operated at a high speed, the heat generation efficiency brought about by the exhaust valve opening retardation control is lowered. To solve this problem, in the present embodiment, the heat source control section P4 basically carries out the exhaust valve opening retardation control as the heat generation increase control when the engine 10 is in the idle operation with a low engine speed. However, when the engine 10 is in the vehicle traveling state with a high engine speed, the heat source control section P4 performs the ignition timing retardation control as the heat generation increase control.

FIG. 4 is a flowchart of a heat generation increase request control routine employed in the present embodiment. The procedure of the routine is carried out by the electronic control unit 20 repeatedly and periodically when the engine 10 is in operation.

Once the routine is started, the electronic control unit 20 first calculates the engine coolant temperature (the necessary coolant temperature) needed by the heater core 17 and the time (the necessary time) at which this engine coolant temperature becomes necessary in step S101. Specifically, the necessary coolant temperature and the necessary time are determined based on the heated air blowing temperature of the heater device, which is calculated from the set temperature Tset of the heater device, the passenger compartment temperature TR, the ambient temperature Tam, and the insolation amount Ts. The procedure carried out by the electronic control unit 20 in step S101 corresponds to the processing performed by the necessary heat calculating section P1.

Subsequently, the electronic control unit 20 calculates the prospective variation curve of the engine coolant temperature based on the operating state of the engine 10. Specifically, the variation curve is calculated using the current engine speed NE, the engine torque Te, the engine coolant temperature ethw, and the ambient temperature Tam. This procedure performed by the electronic control unit 20 in step S102 corresponds to the processing performed by the heat supply estimating section P2. Then, in step S103, the electronic control unit 20 calculates the estimate of the engine coolant temperature (the estimated coolant temperature) at the necessary time obtained in step S101 using the variation curve determined in step S102. The electronic control unit 20 compares the obtained estimated coolant temperature with the necessary coolant temperature calculated in step S101. If the estimated coolant temperature is less than the necessary coolant temperature (S103: YES), the electronic control unit 20 carries out step S104. In step S104, the electronic control unit 20 generates a heat generation increase request and then suspends the current cycle of the routine. In contrast, when the estimated coolant temperature is greater than or equal to the necessary coolant temperature (S103: NO), the electronic control unit 20 is prevented from generating the heat generation increase request (S105) and ends the current cycle of the routine. The procedures performed by the electronic control unit 20 in steps S103 and S104 correspond to the procedure performed by the heat generation increase requesting section P3.

FIG. 5 is a flowchart representing the heat generation increase routine employed in the present embodiment. The procedure of the routine is also performed by the electronic control unit 20 repeatedly and periodically when the engine 10 is in operation.

Once the routine is started, the electronic control unit 20 first determines whether a heat generation increase request has been generated in step S201. When the heat generation increase request has not been generated (S201: NO), the electronic control unit 20 simply ends the current cycle of the routine.

In contrast, if the heat generation increase request has been generated (S201: YES), the electronic control unit 20 performs step S202. In step S202, the electronic control unit 20 selects the heat generation increase control to be performed in accordance with the degree of insufficiency of the heat generation quantity of the engine 10, which is the degree of insufficiency of the estimated coolant temperature with respect to the necessary coolant temperature, and the operating state of the engine 10. In the subsequent step S203, the electronic control unit 20 executes the selected heat generation increase control and ends the current cycle of the routine.

The above-described present embodiment has the advantages described below.

(1) The present embodiment includes the heat source control section P4 for controlling the operating state of the engine 10 mounted in a vehicle, the necessary heat calculating section P1 for calculating the prospective quantity of heat that will be needed by the heater core 17, which consumes the heat generated by the engine 10, the heat supply estimating section P2 for estimating the prospective quantity of heat that will be suppliable by the engine 10 to the heater core 17, and the heat generation increase requesting section P3 for requesting the heat source control section P4 to increase the heat generation quantity of the engine 10 when the heat quantity estimated by the heat supply estimating section P2 is less than the heat quantity calculated by the necessary heat calculating section P1. More specifically, the necessary heat calculating section P1 is configured to calculate the engine coolant temperature (the necessary coolant temperature) needed for ensuring the heat quantity required by the heater core 17 and the time (the necessary time) at which this engine coolant temperature becomes necessary. The heat supply estimating section P2 is configured to estimate the engine coolant temperature (the estimated coolant temperature) at the necessary time in a case in which the current operating state of the engine 10 is maintained. The heat generation increase requesting section P3 is configured to request the heat source control section P4 to increase the quantity of heat generated by the engine 10 when the estimated coolant temperature is less than the necessary coolant temperature. In the present embodiment, which is configured as has been described, the calculation result of the prospective quantity of heat that will be needed by the heater core 17, which consumes the heat produced by the engine 10 mounted in the vehicle, is compared with the estimation result of the prospective quantity of heat that will be suppliable by the engine 10 to the heater core 17. If the prospective quantity of heat that will be suppliable by the engine 10 to the heater core 17 is less than the prospective quantity of heat that will be needed by the heater core 17, a heat generation increase request is provided to the heat source control section P4, which controls the operating state of the engine 10. More specifically, the necessary heat calculating section P1 calculates the engine coolant temperature (the necessary coolant temperature) necessary for ensuring the heat quantity required by the heater core 17 and the time (the necessary time) at which this engine coolant temperature becomes necessary. The heat supply estimating section P2 estimates the engine coolant temperature (the estimated coolant temperature) at the necessary time in the case in which the engine 10 is operated continuously in the current operating state. When the estimated coolant temperature is lower than the necessary coolant temperature, the heat generation increase request for the engine 10 is provided to the heat source control section P4, which controls the operating state of the engine 10. In other words, in the present embodiment, determination whether the quantity of heat generated by the engine 10 is sufficient occurs after determination of the quantity of heat to be needed by the heater core 17 and the time at which this quantity of heat becomes necessary. As a result, in the present embodiment, supply of the heat needed by the heater core 17, which is a heat consuming device, is carried out more efficiently and adequately.

(2) In the present embodiment, to determine whether the quantity of heat supplied from the engine 10 to the heater core 17 is sufficient, the engine coolant temperature (the necessary coolant temperature) needed by the heater core 17 and the time (the necessary time) at which this engine coolant temperature becomes necessary are calculated. In the present embodiment, the quantity of heat that will be suppliable by the engine 10 to the heater core 17 at the obtained necessary time, which is, specifically, the engine coolant temperature at the necessary time, is estimated. More specifically, the prospective variation curve of the prospective quantity of heat (the engine coolant temperature) that will be suppliable by the engine 10 to the heater core 17 is determined. Using the obtained variation curve, the quantity of heat (the engine coolant temperature) that will be suppliable by the engine 10 to the heater core 17 at the necessary time is estimated. As a result, determination whether the heat supply quantity is sufficient is carried out more accurately.

(3) In the present embodiment, the heated air blowing temperature of the heater device is calculated based on the set temperature Tset of the heater device and the environmental conditions (the passenger compartment temperature TR, the ambient temperature Tam, and the insolation amount Ts) inside and outside the passenger compartment. The necessary coolant temperature and the necessary time are obtained in accordance with the determined blowing temperature. As a result, the heat is supplied from the engine 10 to the heater core 17 in such a manner as to ensure sufficient heating performance.

(4) The quantity of heat generated by the engine 10 varies depending on the operating state of the engine 10. If the engine 10 is operated continuously under a condition with a small heat generation quantity, the prospective quantity of heat that will be suppliable by the engine 10 to the heater core 17 is overestimated, thus causing an insufficient heat supply quantity for the heater core 17. However, in the present embodiment, the heat supply estimating section P2 is configured to estimate the engine coolant temperature on the assumption that the engine 10 is operated under an operating condition with a small heat generation quantity. Accordingly, even if the engine 10 is operated under the condition with a small heat generation quantity, the quantity of heat supplied to the heater core 17 is reliably prevented from falling short.

(5) In the present embodiment, the heat source control section P4 is configured to variably set the content of the heat generation increase control for the engine 10 in response to the heat generation increase request from the heat generation increase requesting section P3 in accordance with the degree of insufficiency of the heat quantity (the estimated coolant temperature) estimated by the heat supply estimating section P2 with respect to the heat quantity (the necessary coolant temperature) calculated by the necessary heat calculating section P1. More specifically, the heat generation increase control for the engine 10 in response to the heat generation increase request from the heat generation increase requesting section P3 has the multiple types of control. The heat source control section P4 is configured to select from the types of heat generation increase control in accordance with the degree of insufficiency of the heat quantity (the estimated coolant temperature) estimated by the heat supply estimating section P2 with respect to the heat quantity (the necessary coolant temperature) calculated by the necessary heat calculating section P1. Specifically, when the degree of insufficiency of the aforementioned heat quantity is small, the heat source control section P4 selects the type of control with a high heat generation efficiency and small increase in the heat generation quantity of the engine 10. When the degree of insufficiency of the heat quantity is great, the heat source control section P4 selects the type of control with great increase in the heat generation quantity of the engine 10 and low heat generation efficiency. More specifically, for example, the heat source control section P4 selects the exhaust valve opening retardation control when the degree of insufficiency of the heat quantity is small and the ignition timing retardation control when the degree of insufficiency of the heat quantity is great. As a result, unless the degree of insufficiency of the heat quantity becomes excessively great, the heat generation increase control is performed with the heat generation efficiency maintained high. The heat supply for the heater core 17 is thus carried out more effectively.

(6) In the present embodiment, the heat generation increase control for the engine 10 in response to the heat generation increase request from the heat generation increase requesting section P3 has multiple types of control. The heat source control section P4 is configured to select which type of the heat generation increase control should be performed in accordance with the operating state of the engine 10. In other words, in the present embodiment, the heat source control section P4 is configured to select the type of the heat generation increase control with the maximum heat generation efficiency for the current operating state of the engine 10. Specifically, for example, in the present embodiment, the heat source control section P4 selects the exhaust gas valve opening retardation control as the heat generation increase control when the speed of the engine 10 is low, and the ignition timing retardation control as the heat generation increase control when the speed of the engine 10 is high. As a result, an optimal type of the heat generation increase control is performed in accordance with the current operating state of the engine 10. The heat supply for the heater core 17 is thus carried out more efficiently.

Second Embodiment

A second embodiment of the control device for a vehicle according to the invention will now be described in detail with reference to FIG. 6. Same or like reference numerals are given to components of the present embodiment and the other embodiments that will be described later that are the same as or like corresponding components of the above described embodiment. Detailed description of such components will be omitted.

When the heat generation increase control is performed in response to the heat generation increase request from the heat generation increase requesting section P3, the operating state of the engine 10 may change, thus influencing the travel of the vehicle. Also, when the vehicle runs, operation control is performed on the engine 10 in response to a request other than the heat generation increase request. The operation control may be, for example, torque demand control for adjusting output torque of the engine 10 in such a manner as to satisfy the torque required by the driver, which is obtained from the accelerator operating amount. Accordingly, if the heat generation increase control is carried out when the vehicle runs, adjustment must be carried out between the operation control on the engine 10 responding to the other request and the heat generation increase control, which complicates controlling. To solve the problem, in the present embodiment, the heat source control section P4 is configured to perform the heat generation increase control in response to the heat generation increase request from the heat generation increase requesting section P3 when the load required for the engine 10 is zero.

FIG. 6 is a flowchart representing a heat generation increase control routine employed in the present embodiment. The procedure of the routine is executed by the electronic control unit 20 periodically and repeatedly when the engine 10 operates, instead of the heat generation increase control routine for the present embodiment, which is represented in FIG. 5.

Once the routine is started, the electronic control unit 20 determines whether a heat generation increase request has been generated in step S301. When the heat generation increase request has not been generated (S301: NO), the electronic control unit 20 simply ends the current cycle of the routine.

In contrast, when the heat generation increase request has been generated (S301: YES), the electronic control unit 20 performs S302. In step S302, the electronic control unit 20 selects the type of the heat generation increase control to be performed in accordance with the degree of insufficiency of the heat generation quantity of the engine 10, which is the degree of insufficiency of the estimated coolant temperature with respect to the necessary coolant temperature, and the operating state of the engine 10.

Subsequently, in step S303, the electronic control unit 20 determines whether the accelerator operating amount is smaller than or equal to zero, or, in other words, the load required for the engine 10 is zero. In step S304, the electronic control unit 20 carries out the type of the heat generation increase control selected in step S302 only if the accelerator operating amount is smaller than or equal to zero (S303: YES).

The present embodiment, which has been described, has the advantage described below in addition to the above-described advantages (1) to (6).

(7) In the present embodiment, the heat source control section P4 is configured to perform the heat generation increase control in response to the heat generation increase request from the heat generation increase requesting section P3 when the load required for the engine 10 is zero. As a result, the heat generation increase control is carried out comparatively flexibly, without being restricted by traveling of the vehicle or other operating controls.

Third Embodiment

In the above described embodiments, the heat generation increase request control and the heat generation increase control according to the present invention are performed for the heat supply from the engine 10 to the heater core 17, which serves as the heat consuming device. However, the invention may be used also for heat supply from the engine 10 to a heat consuming device other than a heater core 17. The heat consuming device other than a heater core 17 may be, for example, an oil warmer for a transmission, a battery, a motor, a differential, a fuel cell stack, and a heat storage device.

In the present embodiment, the invention is employed for a heat storage device. The heat storage device in the present embodiment is configured as a heat insulation container for retaining engine coolant water. Specifically, the heat storage device stores heated engine coolant water from a previous running cycle of the vehicle and releases the stored heated coolant water into a coolant circuit the next time the engine is started. In this manner, warm-up of the engine is quickly completed.

Also when the heat consuming device is the heat storage device, the heat generation increase request control and the heat generation increase control are performed basically in the same way as the above embodiments. However, in the present embodiment, the necessary coolant temperature and the necessary time are calculated by the necessary heat calculating section P1 as described below. Specifically, in this case, the necessary heat calculating section P1 sets the target value for the time at which the heat storage device starts retaining the heated engine coolant water as the necessary time and the engine coolant temperature necessary for quick completion of the warm-up of the engine 10 as the necessary coolant temperature. The necessary time may be either a constantly fixed value or a variable value depending on the ambient temperature or the like. After the necessary heat calculating section P1 determines the necessary coolant temperature and the necessary time, the procedures are carried out in the same manner as the above embodiments.

The present embodiment has the advantages that are the same as or similar to the above-described advantages (1) to (7). Even when the invention is used for a heat consuming device other than the heat storage device, the same goal as those of the above embodiments can be achieved simply by changing the manners by which the necessary heat calculating section P1 sets the necessary coolant temperature and the necessary time in accordance with the heat consuming device. For example, if the heat consuming device is an oil warmer, the necessary coolant temperature and the necessary time may be set based on the oil temperature or the coolant temperature. If the heat consuming device is a battery or a motor, the necessary coolant temperature and the necessary time may be set based on the ambient temperature.

The above embodiments, which have been described, may be modified as described below.

In the illustrated embodiments, the heat generation increase control includes three types of control, which are the exhaust valve opening retardation control, the ignition timing retardation control, and the idle-up control. The three types of control are used selectively in accordance with the degree of insufficiency of the heat quantity and the operating state of the engine 10. As the heat generation increase control, other types of control than these three types may be employed. Also in this case, when the degree of insufficiency of the heat quantity is small, the type of control with a high heat generation efficiency and small increase in the heat generation quantity of the engine 10 is selected. When the degree of insufficiency of the heat quantity is great, the type of control with great increase in the heat generation quantity of the engine 10 and low heat generation efficiency is selected. As a result, the heat generation quantity of the engine 10 is increased efficiently. Further, by switching from one type of the heat generation increase control to another as needed selectively in accordance with the operating state of the engine 10, efficient execution of the heat generation quantity increase control is ensured in accordance with the current operating state of the engine 10. Conventionally, various types of control have been proposed as heat generation increase control for the engine 10 for the purpose of promoting engine warm-up. These publicly known types of control are all usable as the heat generation increase control.

The illustrated embodiments each have the multiple types of heat generation increase control, which are used selectively in accordance with the operating state of the engine 10 and the degree of insufficiency of the heat quantity. Even when a single type of control can be used as the heat generation increase control, supply of the heat needed by a heat consuming device may be performed more efficiently and accurately by determining whether the type of control can be performed through the heat generation increase request control as in the cases of the illustrated embodiments.

In the illustrated embodiments, the engine coolant temperature is used as the indication value of the prospective quantity of heat that will be needed by the heat consuming device and the indication value of the prospective quantity of heat that will be suppliable by the engine 10, which is the heat source, to the heat consuming device. However, a parameter other than the engine coolant temperature may be used as these indication values. For example, in a vehicle in which heat is supplied from a heat source to a heat consuming device through heat transmission medium other than engine coolant water, the temperature of the heat transmission medium may be used as the aforementioned indication values. Alternatively, if the heat source generates heat intermittently, the time in which the heat source produces heat may be used as an indication value of the heat quantity. As has been described, any parameter in correlation with the quantity of heat supplied from a heat source to a heat consuming device may be used as an indication value of the heat quantity calculated by the necessary heat calculating section P1 or estimated by the heat supply estimating section P2. The quantity of heat supplied from the heat source to the heat consuming device may be directly calculated and used.

In the illustrated embodiments, the heat supply estimating section P2 determines the prospective variation curve of the heat quantity that will be suppliable by the engine 10, which is the heat source, to the heat consuming device and estimates the prospective heat supply quantity at the aforementioned necessary time with reference to the variation curve. It may be determined whether the heat supply quantity is sufficient in the same manner as the embodiments, even if the heat supply estimating section P2 determines the heat supply quantity of the heat source at the necessary time in a pinpoint manner without using the variation curve.

In the illustrated embodiments, the heat supply estimating section P2 estimates the heat supply quantity based on the operating state (such as the current engine speed NE or engine torque Te) of the heat source (the engine 1) and the current engine coolant temperature ethw. However, the heat supply quantity may be estimated simply based on the operating state of the heat source.

In the illustrated embodiments, the heat supply estimating section P2 estimates the heat supply quantity on the assumption that the heat source will be operated continuously in the current operating state. However, the heat supply quantity may be estimated with a previous or prospective operating state of the heat source taken into consideration. For example, if the prospective control schedule for the heat source is determined in advance, estimation of the heat supply quantity may be carried out considering the control schedule. Specifically, for example, if catalyst warm-up control is scheduled to be executed after several seconds, the prospective heat supply quantity may be estimated considering the heat generation by the heat source increased through the catalyst warm-up control.

The heat supply estimating section P2 determines the prospective variation curve of the engine coolant temperature based on the operating state of the engine 10. More specifically, the heat supply estimating section P2 calculates a variation curve of the engine coolant temperature based on the current engine speed NE, the engine torque Te, the engine coolant temperature ethw, and the ambient temperature Tam. In FIG. 3, the variation curve of the engine coolant temperature is a primary curve, which is a straight line. Using the thus obtained variation curve, the estimate for the engine coolant temperature at the time calculated by the necessary heat calculating section P1 may be determined. The heat supply estimating section P2 then sends the thus obtained variation curve to the heat generation increase requesting section P3.

In the illustrated embodiments, the cases in which the heat source is an engine 10 have been described. However, the control device of the present invention may be used also in a vehicle having a device other than an engine 10, such as a motor, an inverter, or a fuel cell, as a heat source for supplying heat to a heat consuming device.

DESCRIPTION OF THE REFERENCE NUMERALS

1 . . . Heat Source, 2 . . . Heat Source Control Section, 3 . . . Heat Consuming Device, 4 . . . Heat Supply Estimating Section, 5 . . . Necessary Heat Calculating Section, 6 . . . Heat Generation Increase Requesting Section, 10 . . . Internal Combustion Engine (Heat Source), 11 . . . Cylinder Head, 12 . . . Cylinder Block, 13 . . . Water Pump, 14 . . . Radiator, 15 . . . Thermostat, 16 . . . Bypass Passage, 17 . . . Heater Core (Heat Consuming Device), 18 . . . ATF Warmer, 19 . . . Throttle Body, 20 . . . Electronic Control Unit, P1 . . . Necessary Heat Calculating Section, P2 . . . Heat Supply Calculating Section, 23 . . . Heat Generation Increase Requesting Section, P4 . . . Heat Source Control Section

The invention claimed is:

1. A control device for a vehicle, comprising:
a heat source control section for controlling the operating state of a heat source mounted in the vehicle;
a necessary heat calculating section for calculating an indication value of a prospective quantity of heat that will be needed by a heat consuming device that uses heat produced by the heat source;
a heat supply estimating section for estimating an indication value of a prospective quantity of heat that will be suppliable by the heat source to the heat consuming device; and
a heat generation increase requesting section for requesting the heat source control section to increase a heat generation quantity of the heat source when the quantity of heat indicated by the indication value estimated by the heat supply estimating section is less than the quantity of heat indicated by the indication value calculated by the necessary heat calculating section.

2. The control device for a vehicle according to claim 1, wherein
the necessary heat calculating section calculates an indication value for the quantity of heat needed by the heat consuming device and a time at which the quantity of heat will become necessary, and
the heat supply estimating section estimates an indication value for the quantity of heat that can be supplied from the heat source to the heat consuming device at the calculated time.

3. The control device for a vehicle according to claim 2, wherein the heat supply estimating section obtains a prospective variation curve for the indication value of the quantity of heat that can be supplied from the heat source to the heat consuming device, and estimates the indication value of the quantity of heat that can be supplied at said time with reference to the obtained variation curve.

4. The control device for a vehicle according to claim 2, wherein
the heat consuming device is a heater core for a heater device that heats a passenger compartment, and
the necessary heat calculating section calculates a heated air blowing temperature for the heater device based on a set temperature of the heater device and an environmental condition inside and outside the passenger compartment, and calculates the indication value for the quantity of heat and said time in accordance with the calculated blowing temperature.

5. The control device for a vehicle according to claim 2, wherein the heat supply estimating section estimates the indication value for the quantity of heat on the assumption that the heat source is operated under an operating condition with a small heat generation quantity.

6. The control device for a vehicle according to claim 2, wherein
heat is supplied from the heat source to the heat consuming device through a heat transmission medium, and
the indication value for the quantity of heat is calculated and estimated as the temperature of the heat transmission medium.

7. The control device for a vehicle according to claim 6, wherein the heat source is an internal combustion engine, and wherein the heat transmission medium is coolant water in the engine.

8. The control device for a vehicle according to claim 1, wherein the heat source control section variably sets a content of heat generation increase control for the heat source in response to an increase request for the heat generation quantity from the heat generation increase requesting section in accordance with a degree of insufficiency of the quantity of heat indicated by the indication value estimated by the heat supply estimating section with respect to the quantity of heat indicated by the indication value calculated by the necessary heat calculating section.

9. The control device for a vehicle according to claim 1, wherein the heat source control section has a plurality of controls as the heat generation increase control for the heat source in response to the increase request for the heat generation quantity from the heat generation increase requesting section, the heat source control section selecting a heat generation increase control to be performed from the controls in accordance with a degree of insufficiency of the quantity of heat indicated by the indication value estimated by the heat supply estimating section with respect to the quantity of heat indicated by the indication value calculated by the necessary heat calculating section.

10. The control device for a vehicle according to claim 9, wherein the heat source control section has, as the heat generation increase control, a first control with a high heat generation efficiency and a small increase in the heat generation quantity of the heat source and a second control with a great increase in the heat generation quantity of the heat source and a low heat generation efficiency, the heat source control section selecting the first control when the degree of insufficiency of the quantity of heat is small, and selects the second control when the degree of insufficiency of the quantity of heat is great.

11. The control device for a vehicle according to claim 9, wherein
the heat source is the internal combustion engine, and
the heat source control section has, as the heat generation increase control, an exhaust valve opening retardation control and an ignition timing retardation control, the heat source control section selecting the exhaust valve opening retardation control when the degree of insufficiency of the quantity of heat is small, and selecting the ignition timing retardation control when the degree of insufficiency of the quantity of heat is great.

12. The control device for a vehicle according to claim 1, wherein the heat source control section has a plurality of controls as the heat generation increase control for the heat source in response to the increase request for the heat generation quantity from the heat generation increase requesting section, the heat source control section selecting a heat generation increase control to be performed from the controls in accordance with the operating state of the heat source.

13. The control device for a vehicle according to claim 12, wherein the heat source control section selects, as the heat generation increase control to be performed, a control with the highest heat generation efficiency in the current operating state of the heat source.

14. The control device for a vehicle according to claim 12, wherein
the heat source is the internal combustion engine, and
the heat source control section has, as the heat generation increase control, an exhaust valve opening retardation control and an ignition timing retardation control, the heat source control section selecting the exhaust valve opening retardation control when the speed of the engine is low, and selecting the ignition timing retardation control when the speed of the engine is high.

15. The control device for a vehicle according to claim 1, wherein, when a load required for the heat source is zero, the heat source control section carries out the heat generation increase control in response to the increase request for the heat generation quantity from the heat generation increase requesting section.

16. A control device for a vehicle comprising:
a heat source control section for controlling the operating state of a heat source mounted in a vehicle;
a necessary heat calculating section for calculating the temperature of a heat transmission medium needed for ensuring a heat quantity required by a heat consuming device that uses heat supplied from the heat source through the heat transmission medium, and a time at which the temperature will be necessary;
a heat supply estimating section for estimating the temperature of the heat transmission medium at said time in a case in which the heat source is operated continuously in the current operating state; and
a heat generation increase requesting section for requesting the heat source control section to increase a heat generation quantity of the heat source when the temperature of the heat transmission medium estimated by the heat supply estimating section is lower than the temperature of the heat transmission medium calculated by the necessary heat calculating section.

17. The control device for a vehicle according to claim 16, wherein
the heat source is an internal combustion engine, and
the heat transmission medium is coolant water in the engine.

18. The control device for a vehicle according to claim 16, wherein
the heat consuming device is a heater core for a heater device that heats a passenger compartment, and
the necessary heat calculating section calculates a heated air blowing temperature of the heater device based on a set temperature of the heater device and an environmental condition inside and outside the passenger compartment, and calculates the temperature of the heat transmission medium and said time in accordance with the calculated blowing temperature.

19. The control device for a vehicle according to claim 16, wherein the heat supply estimating section estimates the temperature of the heat transmission medium on the assumption that the heat source is operated under an operating condition with a small heat generation quantity.

20. The control device for a vehicle according to claim 16, wherein the heat source control section variably sets a content of heat generation increase control for the heat source in response to an increase request for the heat generation quantity from the heat generation increase requesting section in accordance with a degree of insufficiency of the temperature of the heat transmission medium estimated by the heat supply estimating section with respect to the temperature of the heat transmission medium calculated by the necessary heat calculating section.

21. The control device for a vehicle according to claim 16, wherein the heat source control section has a plurality of controls as the heat generation increase control for the heat source in response to the increase request for the heat generation quantity from the heat generation increase requesting section, the heat source control section selecting a heat generation increase control to be performed from the controls in accordance with a degree of insufficiency of the temperature of the heat transmission medium estimated by the heat supply estimating section with respect to the temperature of the heat transmission medium calculated by the necessary heat calculating section.

22. The control device for a vehicle according to claim 21, wherein the heat source control section has, as the heat generation increase control, a first control with a high heat generation efficiency and a small increase in the heat generation quantity of the heat source and a second control with a great increase in the heat generation quantity of the heat source and a low heat generation efficiency, the heat source control section selecting the first control when the degree of insufficiency of the temperature of the heat transmission medium is small, and selects the second control when the degree of insufficiency of the temperature of the heat transmission medium is great.

23. The control device for a vehicle according to claim 21, wherein
the heat source is the internal combustion engine, and
the heat source control section has, as the heat generation increase control, an exhaust valve opening retardation control and an ignition timing retardation control, the heat source control section selecting the exhaust valve opening retardation control when the degree of insufficiency of the temperature of the heat transmission medium is small, and selecting the ignition timing retardation control when the degree of insufficiency of the temperature of the heat transmission medium is great.

24. The control device for a vehicle according to claim 16, wherein the heat source control section has a plurality of controls as the heat generation increase control for the heat source in response to the increase request for the heat generation quantity from the heat generation increase requesting section, the heat source control section selecting a heat generation increase control to be performed from the controls in accordance with the operating state of the heat source.

25. The control device for a vehicle according to claim 24, wherein the heat source control section selects, as the heat generation increase control to be performed, a control with the highest heat generation efficiency in the current operating state of the heat source.

26. The control device for a vehicle according to claim 24, wherein
the heat source is the internal combustion engine, and
the heat source control section has, as the heat generation increase control, an exhaust valve opening retardation control and an ignition timing retardation control, the heat source control section selecting the exhaust valve opening retardation control when the speed of the engine is low, and selecting the ignition timing retardation control when the speed of the engine is high.

27. The control device for a vehicle according to claim 16, wherein, when a load required for the heat source is zero, the heat source control section carries out the heat generation increase control in response to the increase request for the heat generation quantity from the heat generation increase requesting section.

* * * * *